(12) United States Patent
Schwing et al.

(10) Patent No.: US 10,558,652 B2
(45) Date of Patent: Feb. 11, 2020

(54) MERGING MULTIPROVIDERS IN A DATABASE CALCULATION SCENARIO

(71) Applicant: SAP SE, Walldorf (DE)

(72) Inventors: Julian Schwing, Heidelberg (DE); Johannes Merx, Heidelberg (DE); Christoph Weyerhaeuser, Leimen (DE)

(73) Assignee: SAP SE, Walldorf (DE)

( * ) Notice: Subject to any disclaimer, the term of this patent is extended or adjusted under 35 U.S.C. 154(b) by 235 days.

(21) Appl. No.: 15/650,800

(22) Filed: Jul. 14, 2017

(65) Prior Publication Data

US 2019/0018876 A1 Jan. 17, 2019

(51) Int. Cl.

| G06F 17/30 | (2006.01) |
|---|---|
| G06F 16/242 | (2019.01) |
| G06F 16/84 | (2019.01) |
| G06F 16/2453 | (2019.01) |
| G06F 16/2455 | (2019.01) |
| G06F 16/28 | (2019.01) |

(52) U.S. Cl.
CPC ...... *G06F 16/244* (2019.01); *G06F 16/24544* (2019.01); *G06F 16/86* (2019.01); *G06F 16/2456* (2019.01); *G06F 16/283* (2019.01)

(58) Field of Classification Search
CPC ............ G06F 16/283; G06F 16/24544; G06F 16/2264; G06F 16/245; G06F 16/2453; G06F 16/24554; G06F 16/244; G06F 16/2445; G06F 16/24542; G06F 16/254; G06F 16/278; G06F 16/284; G06F 16/86

USPC ................ 707/714, 754, 602, 718
See application file for complete search history.

(56) References Cited

U.S. PATENT DOCUMENTS

| 9,760,604 B2* | 9/2017 | Billington ........... G06F 16/9535 |
|---|---|---|
| 10,185,755 B2* | 1/2019 | Jahankhani ......... G06F 16/2455 |
| 2003/0115207 A1* | 6/2003 | Bowman ................ G06Q 10/06 |
| 2008/0027830 A1* | 1/2008 | Johnson ............. G06Q 30/0272 705/14.68 |
| 2015/0088851 A1* | 3/2015 | Deshpande ......... G06F 16/9535 707/708 |
| 2015/0262126 A1* | 9/2015 | Gillespie ............... G06F 16/254 705/342 |
| 2016/0350374 A1* | 12/2016 | Weyerhaeuser .. G06F 16/24544 |

* cited by examiner

*Primary Examiner* — Dangelino N Gortayo
(74) *Attorney, Agent, or Firm* — Mintz Levin Cohn Ferris Glovsky and Popeo, P.C.

(57) ABSTRACT

A method may include executing a calculation scenario at a database. The calculation scenario may include a parent multiprovider aggregating data from a child multiprovider. The calculation scenario may be executed by mapping a first count keyfigure of the child multiprovider to a first sum keyfigure of the parent multiprovider if the child multiprovider aggregates data from part providers but not from multiproviders. A second sum keyfigure of the child multiprovider may be mapped to the first sum keyfigure of the parent multiprovider if the child multiprovider aggregates data from multiproviders but not from any part providers. The first count keyfigure of the child multiprovider may be mapped to a second count keyfigure of the parent multiprovider and the second sum keyfigure of the child multiprovider may be mapped to the first sum keyfigure of the parent multiprovider if the child multiprovider aggregates data from part providers and multiproviders.

16 Claims, 7 Drawing Sheets

| SALES | COUNTRY | CITY | PRODUCT |
|---|---|---|---|
| 100 | Germany | Walldorf | Bicycle |
| 200 | Germany | Frankfurt | Automobile |
| 150 | Germany | Munich | Automobile |
| 100 | Germany | Berlin | Bicycle |
| 300 | United States | New York | Bicycle |
| 150 | United States | San Francisco | Automobile |
| 350 | Canada | Vancouver | Automobile |
| 250 | Canada | Toronto | Bicycle |

212 — 214 — 216

125B

| SALES | COUNTRY | CITY | PRODUCT |
|---|---|---|---|
| 250 | Germany | Frankfurt | Bicycle |
| 150 | Germany | Frankfurt | Automobile |
| 300 | Germany | Walldorf | Automobile |
| 150 | Germany | Walldorf | Bicycle |
| 250 | United States | San Francisco | Bicycle |
| 250 | United States | San Francisco | Automobile |
| 150 | United States | San Francisco | Automobile |
| 350 | Canada | Toronto | Bicycle |
| 150 | Canada | Toronto | Bicycle |

MERGING MULTIPROVIDERS IN A DATABASE CALCULATION SCENARIO

TECHNICAL FIELD

The subject matter described herein relates generally to database processing and more specifically to merging multiproviders in a database calculation scenario.

BACKGROUND

Calculation scenarios can be described as acyclic graphs which represent the data flow and data manipulation process for executing a database query. A calculation scenario can include different operations, which can be applied to data from a variety of data sources. For example, the calculation scenario can include relational operations such as joins, aggregations, unions, and/or the like, as well as non-relational operations like database architecture-specific operators, script-based operators, and/or the like.

SUMMARY

Systems, methods, and articles of manufacture, including computer program products, are provided for merging multiproviders. In one aspect, there is provided a system. The system may include at least one data processor and at least one memory. The at least one memory may store instructions that result in operations when executed by the at least one data processor. The operations may include: executing, at a database, a calculation scenario, the calculation scenario including a parent multiprovider that aggregates data from at least one child multiprovider, and the execution of the calculation scenario comprising: mapping a first count keyfigure of the child multiprovider to a first sum keyfigure of the parent multiprovider in response to the child multiprovider aggregating data from one or more part providers but not from other multiproviders, mapping a second sum keyfigure of the child multiprovider to the first sum keyfigure of the parent multiprovider in response to the child multiprovider aggregating data from one or more other multiproviders but not from part providers, and mapping the first count keyfigure of the child multiprovider to a second count keyfigure of the parent multiprovider and the second sum keyfigure of the child multiprovider to the first sum keyfigure of the parent multiprovider in response to the child multiprovider aggregating data from both the one or more part providers and the one or more other multiproviders.

In some variations, one or more features disclosed herein including the following features can optionally be included in any feasible combination. The execution of the calculation scenario may further include optimizing the calculation scenario by at least merging the parent multiprovider and the child multiprovider. The parent multiprovider and the child multiprovider are merged by at least: adding, to the parent multiprovider, at least one part provider from which the child multiprovider aggregates data, the at least one part provider comprising a data partition; and removing the child multiprovider as a calculation node from the calculation scenario. The first count keyfigure may include a quantity of data records aggregated from the at least one part provider. The quantity of data records aggregated from the at least one part provider is included in the second count keyfigure of the parent multiprovider as a result of the child multiprovider being merged with the parent multiprovider.

In some variations, the parent multiprovider and/or the child multiprovider may be calculation nodes in the calculation scenario. The second sum keyfigure may include a quantity of data records aggregated from the one or more other multiproviders. The child multiprovider may be associated with the second sum keyfigure but not the first count keyfigure based at least on the child multiprovider aggregating data from one or more other multiproviders but not from any part providers.

In some variations, the child multiprovider may be further associated with a calculated keyfigure based on the child multiprovider aggregating data from the one or more part providers and the one or more other multiproviders. The calculated keyfigure may include a sum of the first count keyfigure and the second sum keyfigure.

In some variations, the execution of the calculation scenario may further include determining a total quantity of data records aggregated by the parent multiprovider by at least determining the first sum keyfigure and/or the second count keyfigure of the parent multiprovider.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A calculation scenario may set forth the operations that are to be performed on data held in a database. Specifically, the calculation scenario may include a plurality of calculation nodes that correspond to the operations to be performed on the data held in the database. For example, one calculation node may be a multiprovider that aggregates data from multiple sources including, for example, one or more part providers and/or other multiproviders. Here, a part provider may be an individual data partition at the database, which may include a plurality of data records held in a data structure such as, for example, a database table, an information cube, and/or the like. Meanwhile, the other multiproviders may be calculation nodes that further aggregate data from additional part providers and/or multiproviders. The execution of the calculation scenario can include determining a total quantity of data records aggregated by the multiproviders.

Figure 1:
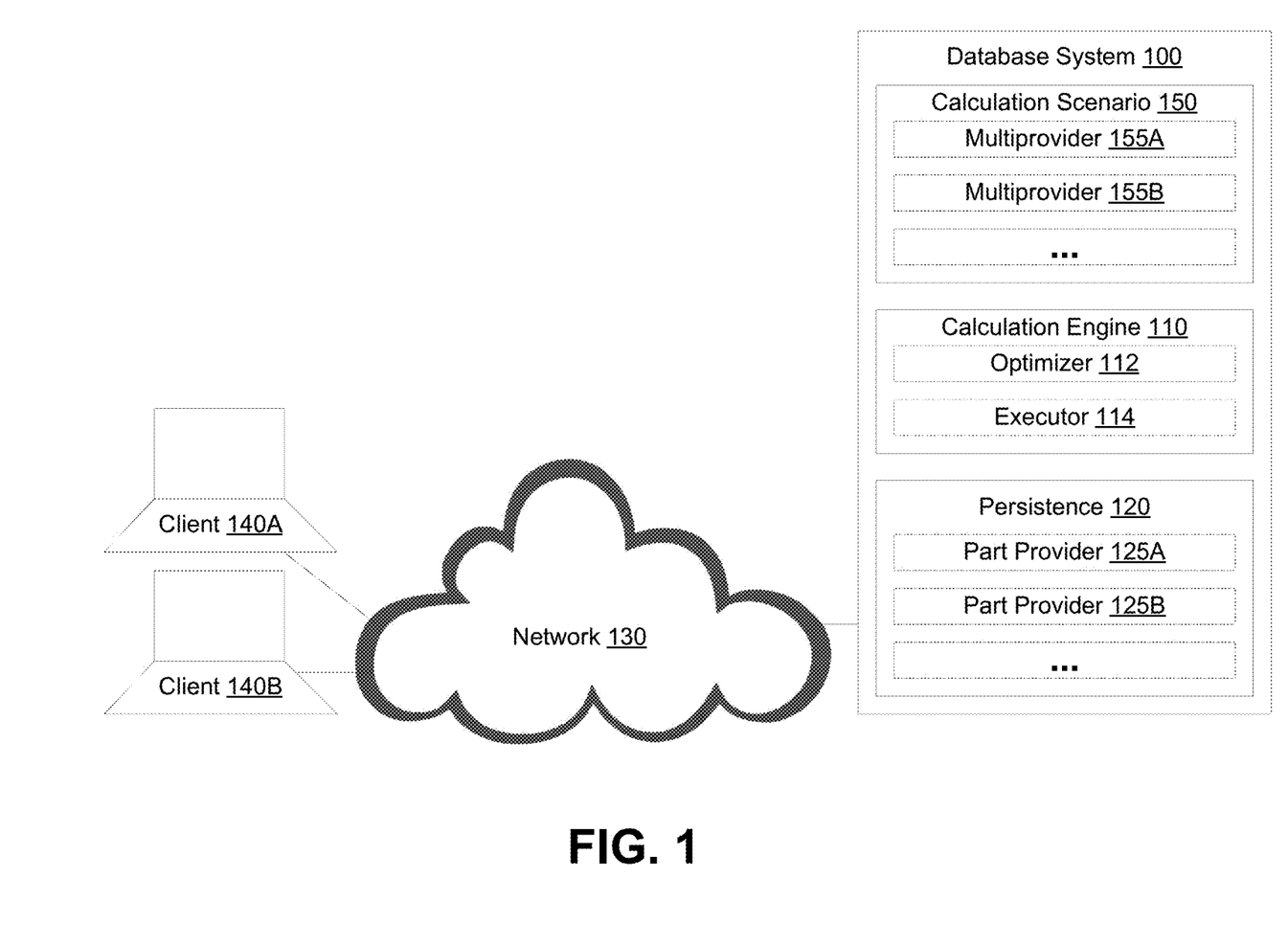
FIG. 1 depicts a system diagram illustrating a database system, in accordance with some example embodiments.

FIG. 1 depicts a system diagram illustrating a database system 100, in accordance with some example embodiments. Referring to FIG. 1, the database system 100 may be any type of database including, for example, an in-memory database, a relational database, a non-SQL (NoSQL) database, and/or the like. As shown in FIG. 1, the database system 100 may include a calculation engine 110 and a persistence 120. Furthermore, the database system 110 may be communicatively coupled, via a network 130, to a plurality of clients including, for example, a first client 140A and a second client 140B. The network 130 may be a wired and/or wireless network including, for example, a wide area network (WAN), a local area network (LAN), a public land mobile network (PLMN), the Internet, and/or the like.

The calculation engine 110 may include an optimizer 112 and an executor 114. The optimizer 112 may be configured to optimize a calculation scenario such as, for example, a calculation scenario 150. As shown in FIG. 1, the calculation scenario 150 may include a plurality of calculation nodes including, for example, a first multiprovider 155A and a second multiprovider 155B.

The multiproviders in the calculation scenario 150 may form a hierarchy in which a parent multiprovider is stacked above one or more children multiproviders. The parent multiprovider may aggregate data from the children multiproviders as well as data from one or more part providers. For example, in order to aggregate data from the children multiproviders and/or the part providers, the parent multiprovider may divide the data into one or more groups based on attributes associated with the data. Each group of data may include one or more data records (e.g., rows of values) that may be aggregated by at least applying an aggregation function such as, for example, average, count, maximum, median, minimum, mode, sum, and/or the like.

Figure 2:
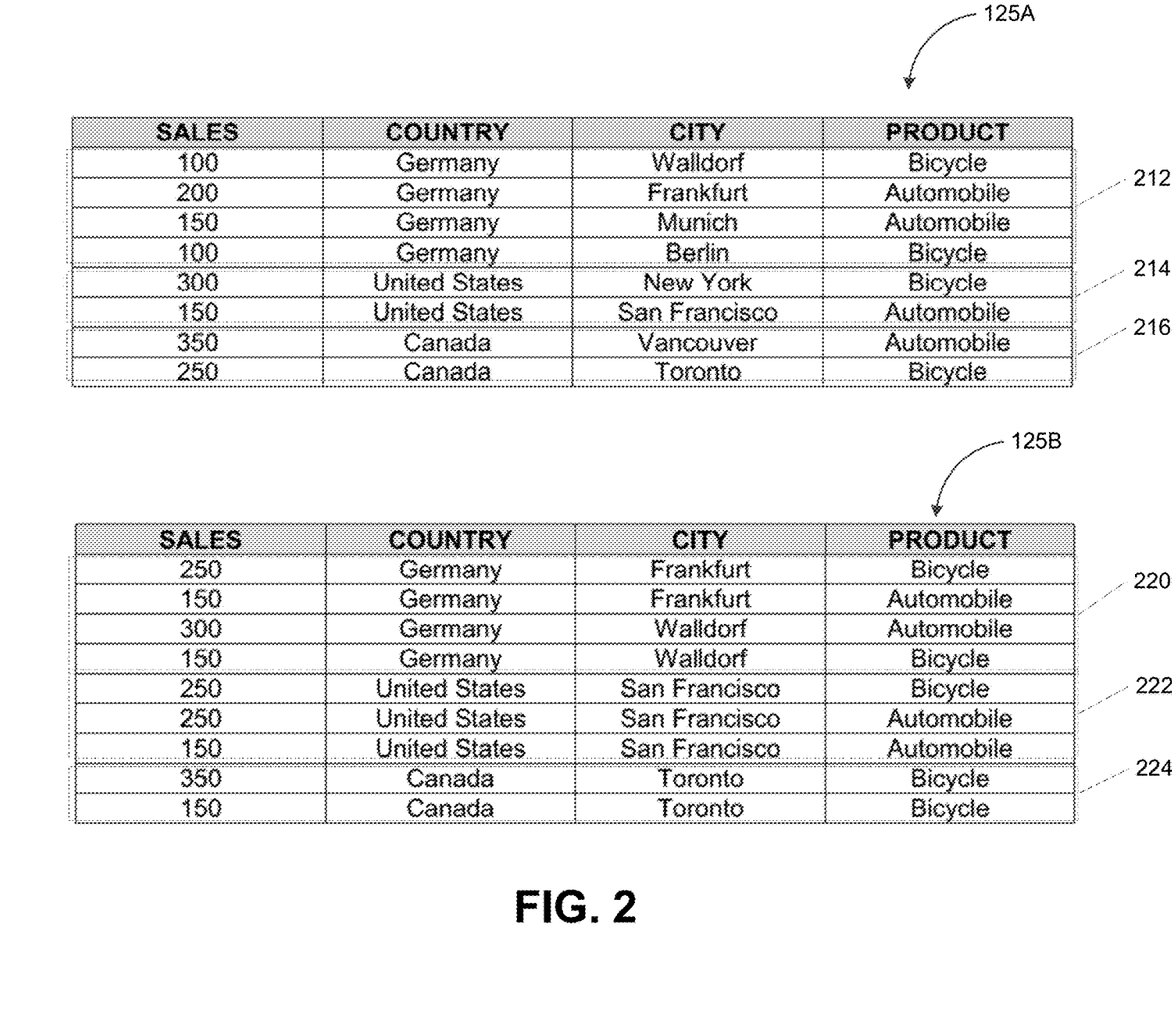
FIG. 2 depicts a first part provider and a second part provider, in accordance with some example embodiments.

To further illustrate, FIG. 2 depicts the first part provider 125A and the second part provider 125B. As shown in FIG. 2, the first part provider 125A may be one data partition holding data records for one accounting time period (e.g., a first fiscal year $y_1$) while the second part provider 125B may be another data partition holding data records for a different accounting time period (e.g., a second fiscal year $y_2$). However, it should be appreciated that the data records from the first part provider 125A and the second part provider 125B may be partitioned in a different manner than shown. For example, the first part provider 125A and second part provider 125B may be data partitions holding data records for different accounting regions.

Referring again to FIG. 2, the first part provider 125A and the second part provider 125B may each be a database table holding a plurality of data records. Aggregating data from the first part provider 125A and/or the second part provider 125B may include dividing these data records into one or more groups based on attributes associated with the data. Data records from each group may further be aggregated by at least applying an aggregation function such as, for example, average, count, maximum, median, minimum, mode, sum, and/or the like. For example, data records from the first part provider 125A may be divided, based on the attribute "country" and/or another attribute, into a first group 212, a second group 214, and/or a third group 216. Meanwhile, the "sales" value from each data record in the first group 212, the second group 214, and/or the third group 216 may be aggregated by applying an aggregation function such as, for example, average, count, maximum, median, minimum, mode, sum, and/or the like. Applying the aggregation function may generate a single value representative of, for example, an average sales value, a maximum sales value, a medium sales value, a minimum sales value, a most frequent sales value, a total sales value, a quantity of sales values, and/or the like, for each country during the first fiscal year $y_1$. Here, the "sales" column from the first part provider 125A may be a keyfigure, which may refer to a column in a database table that is aggregated via one or more aggregation functions. However, it should be appreciated that the keyfigure may be a different column from the first part provider 125A.

Alternatively and/or additionally, the data records from the second part provider 125B may also be separated into groups. For example, as shown in FIG. 2, the data records from the second part provider 125B may also be separated, based on the attribute "country" and/or another attribute, into a fourth group 220, a fifth group 222, and/or a sixth group 224. Here, the "sales" column from the second part provider 125B may also be a keyfigure. As such, the "sales" value from each data record in the fourth group 220, the fifth group 222, and/or the sixth group 224 may be aggregated by applying an aggregation function. Applying the aggregation function may generate a single value representative of, for example, an average sales value, a maximum sales value, a medium sales value, a minimum sales value, a most frequent sales value, a total sales value, a quantity of sales values, and/or the like, for each country during the second fiscal year $y_2$.

The aggregation of the data, for example from the first part provider 125A and the second part provider 125B, may further include determining one or more row count attributes indicative of a total quantity of data records present in the aggregated data. However, while children multiproviders may be merged with the parent multiprovider in order to obviate the generation of intermediate results for the children multiproviders, merging stacked multiproviders may prevent a correct determination of the row count attributes. Thus, according to some example embodiments, each row count attribute may be annotated in order to track row count attributes from different part providers and/or multiproviders when stacked multiproviders are merged during the optimization of a corresponding calculation scenario.

For example, each multiprovider may be associated with a count keyfigure, a sum keyfigure, and/or a calculated keyfigure. These row count attributes may be annotated in order to differentiate between count keyfigures, sum keyfigures, and calculated keyfigures. As used herein, a count keyfigure may correspond to a quantity of data records, such as a number of rows of data records, aggregated from one or more part providers. Thus, a multiprovider that aggregates data from one or more part providers may be associated with a count keyfigure that sums up the quantity of data records aggregated from the part providers. Meanwhile, a sum keyfigure may correspond to a quantity of data records aggregated from one or more child multiproviders. A parent multiprovider that aggregates data from one or more children multiproviders may be associated with a sum keyfigure that sums up the quantity of data records aggregated from the children multiproviders. Where a parent multiprovider aggregates data from both part providers and children multiproviders, the parent multiprovider may be associated with both a count keyfigure corresponding to the quantity of data records aggregated from the part providers and a sum keyfigure corresponding to the quantity of data records aggregated from the children multiproviders. Furthermore, the parent multiprovider may be associated with a calculated keyfigure that sums up the count keyfigure and the sum keyfigure.

To further illustrate, refer again to FIG. 2. Aggregating the first part provider 125A and the second part provider 125B may include combining the first group 212 from the first part provider 125A with the fourth group 220 because both groups include data records for the country "Germany." Doing so may generate a group of data records having a count keyfigure of "8." Aggregating the first part provider 125A with the second part provider 125B may further include combining the second group 214 and the fifth group 222 because both groups include data records for the country "United States." This resulting group of data records may have a count keyfigure of "5." It should be appreciated that aggregating the first part provider 125A and the second part provider 125B may further include applying an aggregation function to matching groups of data records to determine, for example, an average sales value, a maximum sales value, a medium sales value, a minimum sales value, a most frequent sales value, a total sales value, a quantity of sales values, and/or the like, for different countries during the first fiscal year $y_1$ and the second fiscal year $y_2$.

In some example embodiments, annotating different row count attributes may enable a correct determination of the row count attributes when stacked multiproviders are merged during an optimization of the corresponding calculation node. For example, the count keyfigure of the child multiprovider may be mapped to the sum keyfigure of the parent multiprovider if the child multiprovider is only associated with the count keyfigure. The child multiprovider may only be associated with the count keyfigure if the child multiprovider only aggregates data directly from part providers. If the child multiprovider is only associated with a sum keyfigure, the sum keyfigure of the child multiprovider may also be mapped to a sum keyfigure of the parent multiprovider. The child multiprovider may only be associated with the sum keyfigure if the child multiprovider only aggregates data from other multiproviders. Where the child multiprovider is associated with a calculated keyfigure that sums up both a count keyfigure and a sum keyfigure, the count keyfigure may be mapped to the count keyfigure of the parent multiprovider while the sum keyfigure may be mapped to the sum keyfigure of the parent multiprovider. The child multiprovider may be associated with the calculated keyfigure in instances where the child multiprovider aggregates data from both part providers and other multiproviders. This mapping may preserve the ability to determine, at a root multiprovider, a total count of data records aggregated from across all part providers.

Figure 3A:
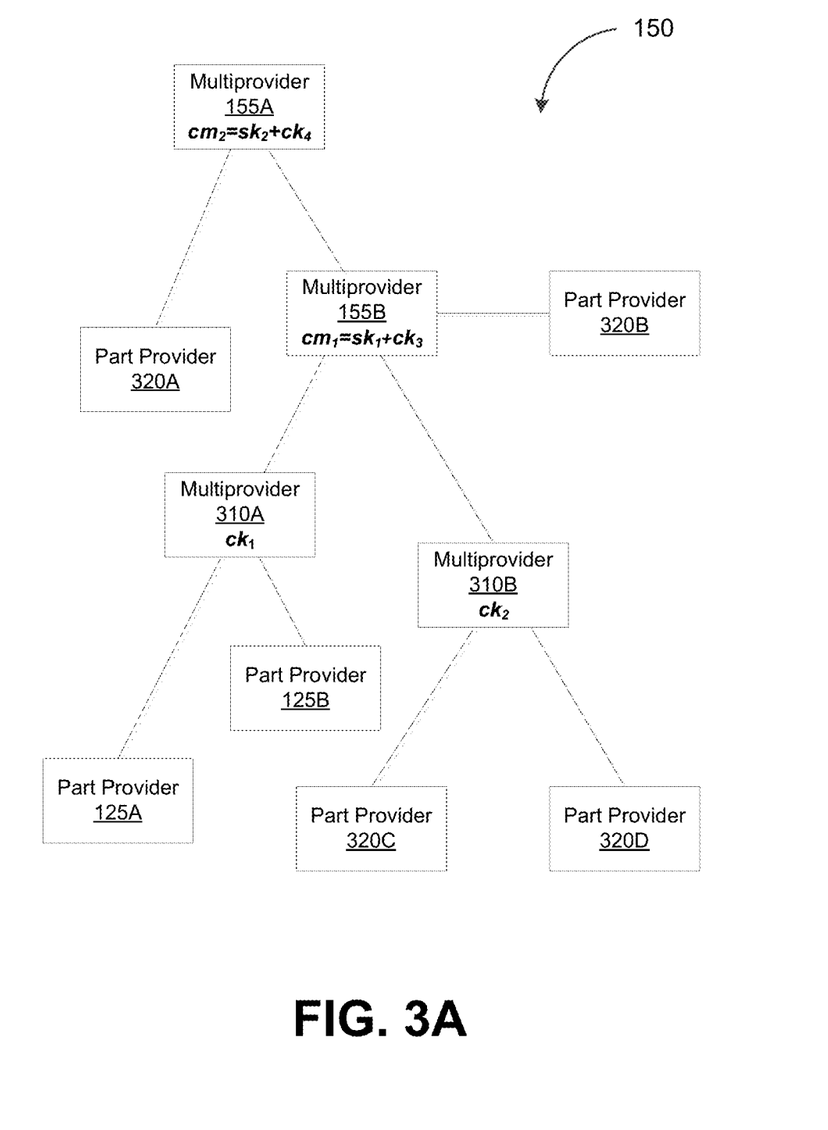
FIG. 3A depicts a block diagram illustrating a calculation scenario, in accordance with some example embodiments.

In some example embodiments, the optimizer 112 may be configured to optimize the calculation scenario 150 by at least merging stacked multiproviders. For example, merging two stacked multiproviders may include adding the part providers of the child multiprovider to the parent multiprovider. The child multiprovider may further be removed as a calculation node. To further illustrate, FIG. 3A depicts a block diagram illustrating the calculation scenario 150, in accordance with some example embodiments. Referring to FIG. 3A, the calculation scenario 150 may include a plurality of multiproviders including, for example, the first multiprovider 155A, the second multiprovider 155B, a third multiprovider 310A, and/or a fourth multiprovider 310B. The first multiprovider 155A, the second multiprovider 115B, the third multiprovider 310A, and the fourth multiprovider 310B may be calculation nodes in the calculation scenario 150. However, it should be appreciated that the calculation scenario 150 may include different and/or additional calculation nodes than shown.

The first multiprovider 155A, the second multiprovider 155B, the third multiprovider 310A, and the fourth multiprovider 310B may form a hierarchy. As shown in FIG. 3A, the first multiprovider 155A may be stacked above the second multiprovider 155B, the third multiprovider 310A, and the fourth multiprovider 310B. Here, the first multiprovider 155A may be a root multiprovider that is at a top of the hierarchy. Furthermore, the first multiprovider 115A may be a parent multiprovider aggregating data from the second multiprovider 155A and a third part provider 320A. Meanwhile, the second multiprovider 155B may be stacked above the third multiprovider 310A and the fourth multiprovider 310B. The second multiprovider 155B may be parent multiprovider that aggregates data from the third multiprovider 310A, the fourth multiprovider 310B, and a fourth part provider 320B. The third multiprovider 310A and the fourth multiprovider 310B may be children multiprovider. For example, the third multiprovider 310A may aggregate data from the first part provider 125A and the second part provider 125B. The fourth multiprovider 310B may aggregate data from a fifth part provider 320C and a sixth part provider 320D.

In order to optimize the calculation scenario 150, the optimizer 112 may merge the third multiprovider 310A and the fourth multiprovider 310B with the second multiprovider 155B. As noted, the part providers of a child multiprovider may be added to the parent multiprovider when the child multiprovider is merged with the parent multiprovider. Merging the child multiprovider with the parent multiprovider may further remove the child multiprovider as a calculation node. Accordingly, merging the third multiprovider 310A with the second multiprovider 155B may include removing the third multiprovider 310A from the calculation scenario 150 while adding the first part provider 125A and the second part provider 125B to the second multiprovider 155B. Similarly, merging the fourth multiprovider 310B with the second multiprovider 155B may include removing the fourth multiprovider 310B from the calculation scenario 150. Furthermore, merging the fourth multiprovider 310B with the second multiprovider 155B may include adding the fifth part provider 320C and the fifth part provider 320D to the second multiprovider 155B.

Alternatively and/or additionally, the calculation scenario 150 may further be optimized by at least merging the second multiprovider 155B with the first multiprovider 155A. Merging the second multiprovider 155B with the first multiprovider 155A may include removing the second multiprovider 155B from the calculation scenario 150. Furthermore, the part providers associated with the second multiprovider 155B may be added to the first multiprovider 155A. Here, the second multiprovider 155B may be associated with the fourth part provider 310B. Furthermore, as a result of the merge with the third multiprovider 310A and the fourth multiprovider 310B, the second multiprovider 155B may also be associated with the first part provider 125A, the second part provider 125B, the fifth part provider 320C, and the sixth part provider 320D. As such, merging the second multiprovider 155B with the first multiprovider 155A may include adding, to the first multiprovider 155A, the first part provider 125A, the second part provider 125B, the fourth part provider 320B, the fifth part provider 320C, and the sixth part provider 320D.

Figure 3B:
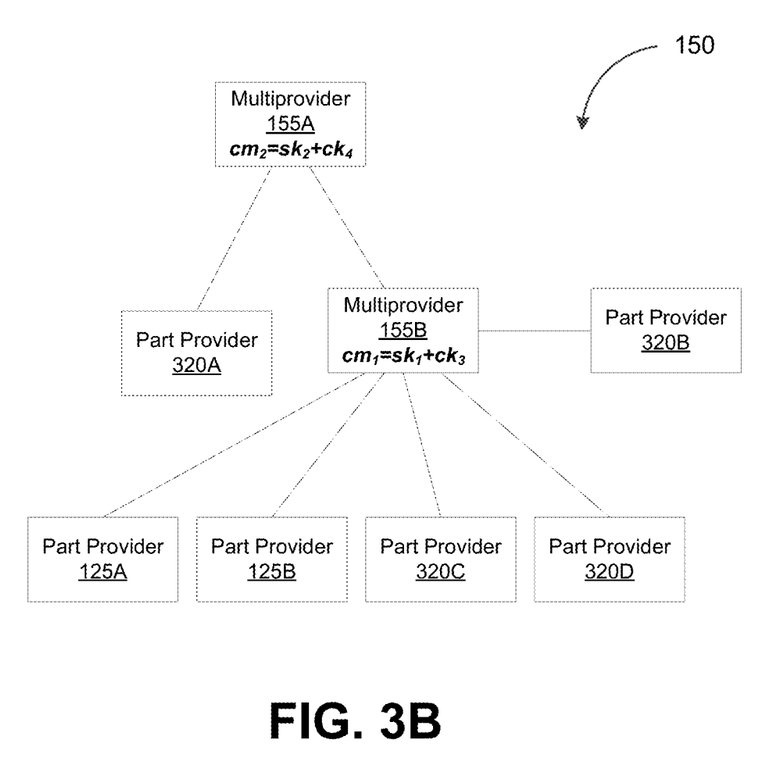
FIG. 3B depicts a block diagram illustrating a partially optimized calculation scenario, in accordance with some example embodiments.
Figure 3C:
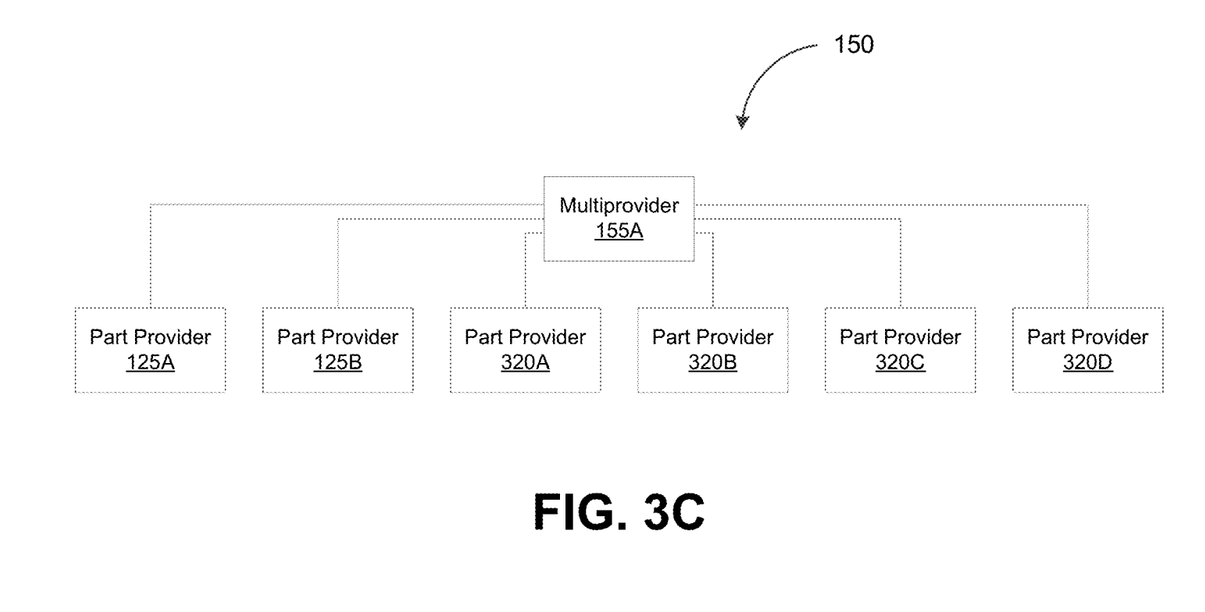
FIG. 3C depicts a block diagram illustrating an optimized calculation scenario, in accordance with some example embodiments.

To further illustrate, FIG. 3C depicts a block diagram illustrating the optimized calculation scenario 150, in accordance with some example embodiments. As shown in FIG. 3C, merging the stacked multiproviders in the calculation scenario 150 may include iteratively removing the children nodes and adding the part providers of the children nodes to their respective parent nodes. Referring to FIG. 3C, the optimized calculation scenario 150 may include the first multiprovider 155A. Subsequent to merging the first multiprovider 155A with its children nodes, the first multiprovider 155A may aggregate data from the first part provider 125A, the second part provider 125B, the third part provider 320A, the fourth part provider 320B, the fifth part provider 320C, and the sixth part provider 320D. As noted, merging stacked multiproviders may obviate the generation of intermediate results at children multiproviders. Thus, merging the stacked multiproviders in the calculation scenario 150 may obviate the generation of intermediate results at the second multiprovider 155B, third multiprovider 310A, and/or the fourth multiprovider 310B.

The first multiprovider 155A, the second multiprovider 155B, the third multiprovider 310A, and/or the fourth multiprovider 310B may be associated with one or more row count attributes including, for example, count keyfigures, sum keyfigures, and/or calculated keyfigures. Referring to FIG. 3A, the first part provider 125A, the second part provider 125B, the third part provider 320A, the fourth part provider 320B, the fifth part provider 320C, and the sixth part provider 320D may each provide a quantity of data records. As such, the third multiprovider 310A may be associated with a first count keyfigure $ck_1$, which may sum up the quantity of data records aggregated from both the first part provider 125A and the second part provider 125B. Meanwhile, the fourth multiprovider 310B may be associated with a second count keyfigure $ck_2$, which may sum up the quantity of data records aggregated from the fifth part provider 320C and the sixth part provider 320D. Although not shown, the third multiprovider 310A and/or the fourth multiprovider 310B may also be associated with a sum keyfigure and/or a calculated keyfigure. However, the sum keyfigure of the third multiprovider 310A and/or the fourth multiprovider 310B may be a null or a zero value because neither the third multiprovider 310A nor the fourth multiprovider 310B aggregates data from a child multiprovider.

Referring again to FIG. 3A, the second multiprovider 155B may be associated with a first sum keyfigure $sk_1$, which may sum up the first count keyfigure $ck_1$ and the second count keyfigure $ck_2$. The second multiprovider 155B may also be associated with a third count keyfigure $ck_3$, which includes the quantity of data records aggregated from the forth part provider 320B. Because the second multiprovider 155B aggregates data from both children multiproviders (e.g., the third multiprovider 310A and the fourth multiprovider 310B) and part providers (e.g., the fourth part provider 320B), the second multiprovider 155B may be associated with a first calculated keyfigure $cm_1$ for summing up the first sum keyfigure $sk_1$ and the third count keyfigure $ck_3$. Meanwhile, the first multiprovider 155A may be associated with a second calculated measure $cm_2$, a second sum keyfigure $sk_2$ and a fourth count keyfigure $ck_4$. The fourth count keyfigure $ck_4$ may include the quantity of data records aggregated from one or more part providers such as, for example, the third part provider 320A. The second sum keyfigure $sk_2$ may correspond to the quantity of data aggregated from one or more children multiproviders such as, for example, the second multiprovider 155B. The second calculated keyfigure $cm_2$ may sum up both the second sum keyfigure $sk_2$ and the fourth count keyfigure $ck_4$. As shown in FIG. 3A, the second calculated keyfigure $ck_2$ may correspond to a total quantity of data records aggregated from the first part provider 125A, the second part provider 125B, the third part provider 320A, the fourth part provider 320, the fifth part provider 320C, and the sixth part provider 320D.

The optimizer 112 may optimize the calculation scenario 150 by at least merging stacked multiproviders. However, the determination of the row count attributes may prevent the merger of stacked multiproviders because of the calculation complexity associated with calculated keyfigures. For instance, the determination of the first calculated keyfigure $cm_1$ at the second multiprovider 155B and/or the second calculated keyfigure $cm_2$ at the first multiprovider 155A may prevent the second multiprovider 155B from being merged with the first multiprovider 155A. Thus, in some example embodiments, the different row count attributes may be annotated in order to enable a differentiation between count keyfigures, sum keyfigures, and calculated keyfigures. The annotation may identify each row count attribute as a count keyfigure, a sum keyfigure, or a calculated keyfigure. It should be appreciated that the annotation may be any type of flag and/or label including, for example, a string, an integer, and/or the like. During the optimization of the calculation scenario 150, these annotations may enable the optimizer 150 to map the row count attributes of a child multiprovider to the corresponding row count attributes of a parent multiprovider. For instance, where the child multiprovider is associated with either a count keyfigure or a sum keyfigure, the count keyfigure or the sum keyfigure of the child multiprovider may be mapped to the sum keyfigure of the parent multiprovider. Alternatively and/or additionally, wherein the child multiprovider is associated with a calculated keyfigure that sums up both a count keyfigure and a sum keyfigure, the optimizer 150 may map, based on the annotations, the sum keyfigure of the child multiprovider to the sum keyfigure of the parent multiprovider and the count keyfigure of the child multiprovider to the count keyfigure of the parent multiprovider.

To further illustrate, optimizing the calculation scenario 150 may include merging the third multiprovider 310A and the fourth multiprovider 310B with the second multiprovider 155B. FIG. 3B depicts a block diagram illustrating the partially optimized calculation scenario 150, in accordance with some example embodiments. With reference to FIG. 3B, the third multiprovider 310A and the fourth multiprovider 310B may be merged with the second multiprovider 155B by removing the third multiprovider 310A and the fourth multiprovider 310. Furthermore, the first part provider 125A, the second part provider 125B, the fifth part provider 320C, and the sixth part provider 320D may be added to the second multiprovider 155B. In some example embodiments, merging the third multiprovider 310A and the fourth multiprovider 310B with the second multiprovider 155B may further include remapping the row count attributes associated with the third multiprovider 310A and the fourth multiprovider 310B. As noted, the different row count attributes may be differentiated based on annotations identifying each row count attribute as a count keyfigure, a sum keyfigure, or a calculated keyfigure.

Where one or more child multiproviders, are removed during the merge, the quantity of data records at each corresponding part provider may be added to the count keyfigures of the remaining parent multiproviders. For example, as shown in FIG. 3C, subsequent to merging the third multiprovider 310A and the fourth multiprovider 310B with the second multiprovider 155B, the optimizer 112 may further optimize the calculation scenario 150 by at least merging the second multiprovider 155B with the first multiprovider 155A. Merging the second multiprovider 155B with the first multiprovider 155A may include removing the second multiprovider 155B and adding the first part provider 125A, the second part provider 125B, the fourth part provider 320B, the fifth part provider 320C, and the sixth part provider 320D to the first multiprovider 155A. Upon removal of the second multiprovider 155B, the third multiprovider 310A, and the fourth multiprovider 310B, the first multiprovider 155A may aggregate data directly from the first part provider 125A, the second part provider 125B, the third part provider 320A, the fourth part provider 320B, the fifth part provider 320C, and the sixth part provider 320D. As such, subsequent to the merging the stacked multiproviders nodes in the calculation scenario 150, the fourth count keyfigure $ck_4$ may include the quantity of data records at the first part provider 125A, the second part provider 125B, the third part provider 320A, the fourth part provider 320B, the fifth part provider 320C, and the sixth part provider 320D.

The executor 114 may be configured to execute the optimized calculation scenario 150. Executing the optimized calculation scenario 150 may include performing a plurality of operations corresponding to the first multiprovider 155A. For instance, executing the optimized calculation scenario 150 may include aggregating data from the first part provider 125A, the second part provider 125B, the third part provider 320A, the fourth part provider 320B, the fifth part provider 320C, and/or the sixth part provider 320D. It should be appreciated the first part provider 125A, the second part provider 125B, the third part provider 320A, the fourth part provider 320B, the fifth part provider 320C, and/or the sixth part provider 320D may be individual data partitions held at the persistence 120. The data may be aggregated by at least applying an application function such as, for example, average, count, maximum, median, minimum, mode, sum, and/or the like.

Figure 4:
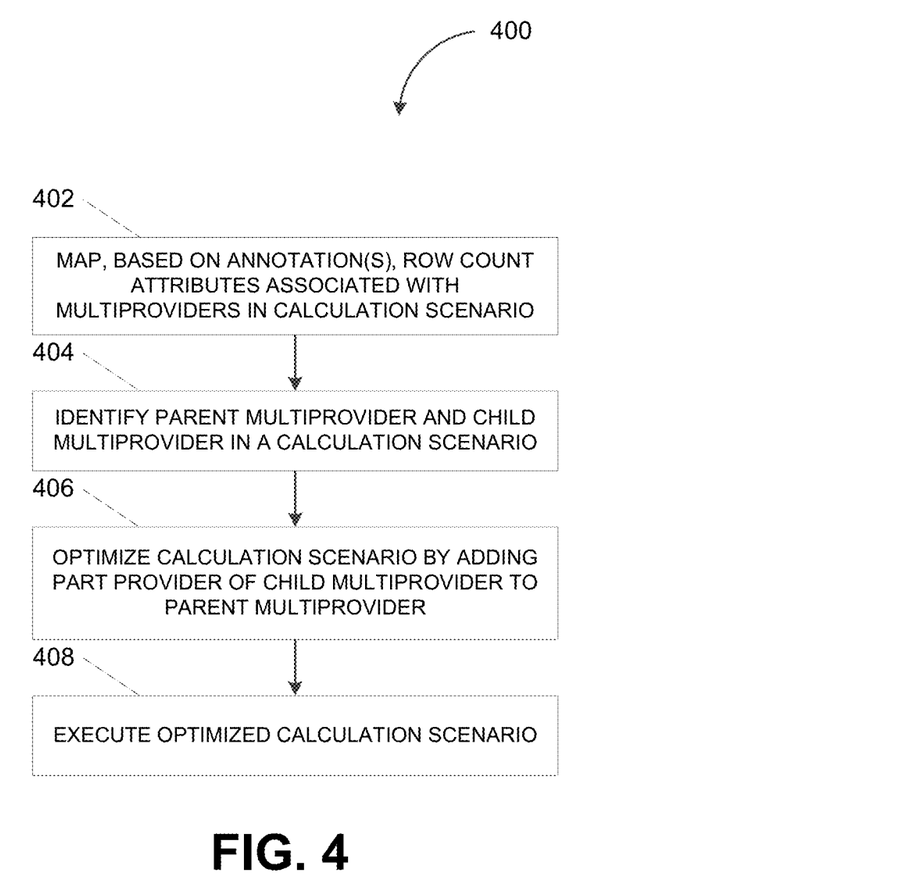
FIG. 4 depicts a flowchart illustrating a process for optimizing a calculation scenario having stacked multiproviders, in accordance with some example embodiments.

FIG. 4 depicts a flowchart illustrating a process 400 for optimizing a calculation scenario, in accordance with some example embodiments. Referring to FIGS. 1-4, the process 400 may be performed by the database system 100, for example, by the calculation engine 110.

At 402, the calculation engine 110 may map, based at least on one or more annotations, one or more row count attributes associated with a plurality of multiproviders in a calculation node. In some example embodiments, row count attributes may be annotated in order to differentiate between different row count attributes such as, for example, count keyfigures, sum keyfigures, and calculated keyfigures. As noted, the annotations may enable a mapping of different row count attributes between parent multiproviders and children multiproviders. For instance, based on the annotations, the count keyfigure of a part provider of the child multiprovider may be mapped to either a count keyfigure of the parent multiprovider or to a sum keyfigure of the parent multiprovider. This mapping may preserve the ability to determine a calculated keyfigure at the parent multiprovider.

Referring again to FIG. 3A, prior to merging the stacked multiprovider nodes present in the calculation scenario 150, the total count of records aggregated from across all part providers may correspond to the second calculated keyfigure $cm_2$ of the first multiprovider 155A, which may be a root multiprovider. The second calculated keyfigure $cm_2$ of the first multiprovider 155A may be a sum of the second key sum keyfigure $sk_2$ and the fourth count keyfigure $ck_4$. The fourth count keyfigure $ck_4$ may include the quantity of data records aggregated from the third part provider 320A. Furthermore, the fourth count keyfigure $ck_4$ may include the third count keyfigure $ck_3$ of the second multiprovider 155B because the third count keyfigure $ck_3$ is mapped to the fourth count keyfigure $ck_4$. Meanwhile, the second sum keyfigure $sk_2$ may include the first sum keyfigure $sk_1$ of the second multiprovider 155B because the first sum keyfigure $sk_1$ may also be mapped to the second key sum keyfigure $sk_2$. As noted, the first sum keyfigure $sk_1$ may include the first count keyfigure $ck_1$ of the third multiprovider 310A and the second count keyfigure $ck_2$ of the fourth multiprovider 310B. The first count keyfigure $ck_1$ may include a quantity of data records aggregated from the first part provider 125A and the second part provider 125B while the second count keyfigure $ck_2$ may include a quantity of data records aggregated from the fifth part provider 320C and the sixth part provider 320D.

At 404, the calculation engine 110 may identify a parent multiprovider and a child multiprovider in a calculation scenario. For example, referring to FIG. 3A, the optimizer 112 may identify, within the calculation scenario 150, a plurality of stacked multiproviders including, for example, the first multiprovider 155A which is stacked above the second multiprovider 155B as well as the second multiprovider 155B which is stacked above both the third multiprovider 310A and the fourth multiprovider 310B.

At 406, the calculation engine 110 may optimize the calculation scenario by at least removing the child part provider from the calculation scenario and adding a part provider of the child multiprovider to the parent multiprovider. For example, the optimizer 112 may optimize the calculation scenario 150 by merging the third multiprovider 310A and the fourth multiprovider 310B with the second multiprovider 155B. As shown in FIG. 3B, merging the third multiprovider 310A with the second multiprovider 155B may remove the third multiprovider 310A from the calculation scenario 150 as well as add the first part provider 125A and the second part provider 125B to the third multiprovider 310A. Meanwhile, merging the fourth multiprovider 310B with the second multiprovider 155B may remove the fourth multiprovider 310B from the calculation scenario 150 as well as add the fifth part provider 320C and the sixth part provider 320D to the second multiprovider 155B. Alternatively and/or additionally, optimizing the calculation scenario 150 may further include merging the second multiprovider 155B with the first multiprovider 155A.

Referring to FIG. 3C, merging the second multiprovider 155B with the first multiprovider 155A may include removing the second multiprovider 155B as well as adding the part providers associated with the second multiprovider 155B to the first multiprovider 155A. Thus, as shown in FIG. 3C, merging the second multiprovider 155B with the first multiprovider 155A may add, to the first multiprovider 155A, the first part provider 125A, the second part provider 125B, the fourth part provider 320B, the fifth part provider 230C, and the sixth part provider 320D.

At 408, the calculation engine 110 may execute the optimized the calculation scenario. For example, in some example embodiments, executing the optimized calculation scenario 150 may include determining a total count of all the data records aggregated from the first part provider 125A, the second part provider 125B, the third part provider 320A, the fourth part provider 320B, the fifth part provider 320C, and the sixth part provider 320D. As noted, subsequent to the merging the stacked multiproviders nodes in the calculation scenario 150, the fourth count keyfigure $ck_4$ may include the quantity of data records at the first part provider 125A, the second part provider 125B, the third part provider 320A, the fourth part provider 320B, the fifth part provider 320C, and the sixth part provider 320D. Thus, the total count of all the data records aggregated from the first part provider 125A, the second part provider 125B, the third part provider 320A, the fourth part provider 320B, the fifth part provider 320C, and the sixth part provider 320D may be determined by at least determining the fourth count keyfigure $ck_4$.

Figure 5:
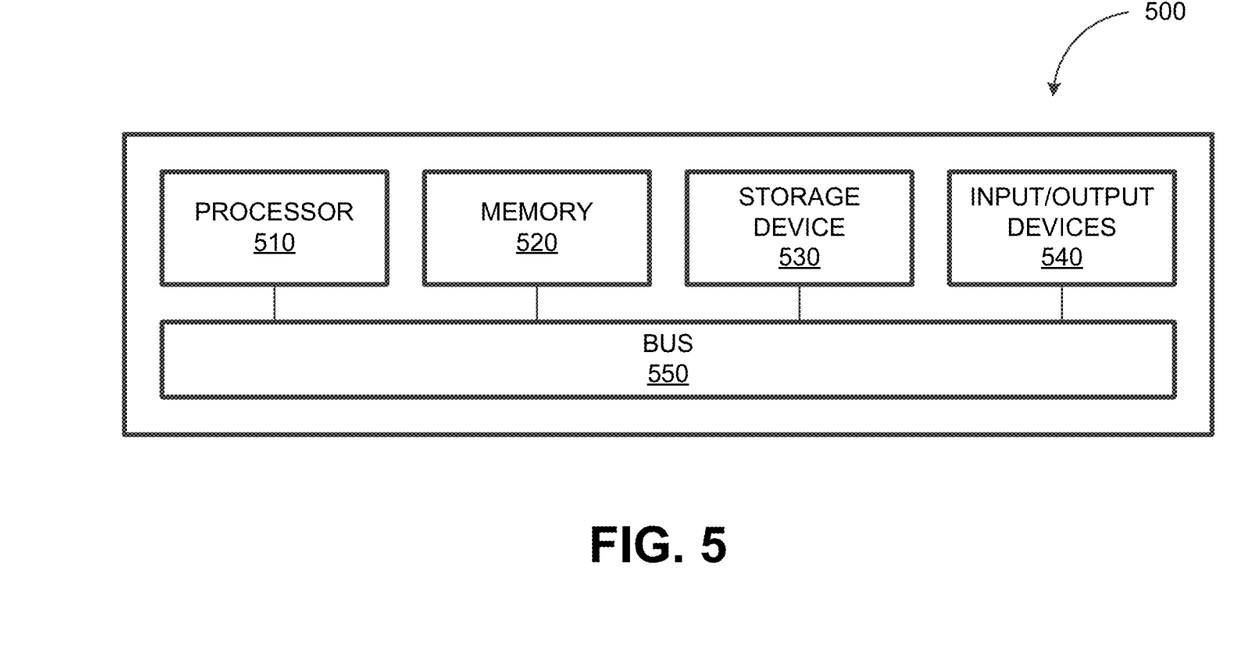
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database system 100, the multitenant database system 200, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database system 100 and/or the multitenant database system 200. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500.

In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   executing, at a database, a calculation scenario, the calculation scenario including a parent multiprovider that aggregates data from a child multiprovider, and the execution of the calculation scenario includes determining a total quantity of data records aggregated by the parent multiprovider by at least
   determining whether the child multiprovider aggregates data from a part provider and/or another multiprovider,
   mapping a first count keyfigure of the child multiprovider to a first sum keyfigure of the parent multiprovider in response to the child multiprovider aggregating data from the part provider but not from the other multiprovider, the first count keyfigure corresponding to a first quantity of data records the child multiprovider aggregates from the part provider but not from the other multiprovider, and the first sum keyfigure corresponding to a second quantity of data records the parent multiprovider aggregates from the child multiprovider but not from one or more part providers,
   mapping a second sum keyfigure of the child multiprovider to the first sum keyfigure of the parent multiprovider in response to the child multiprovider aggregating data from the other multiprovider but not from the part provider, the second sum keyfigure corresponding to a third quantity of data records the child multiprovider aggregates from the other multiprovider but not from the part provider, and
   mapping the first count keyfigure of the child multiprovider to a second count keyfigure of the parent multiprovider and the second sum keyfigure of the child multiprovider to the first sum keyfigure of the parent multiprovider in response to the child multiprovider aggregating data from the part provider and the other multiprovider, the second count keyfigure corresponding to a fourth quantity of data records the parent multiprovider aggregates from the part provider but not from one or more other multiproviders.

2. The system of claim 1, wherein the execution of the calculation scenario further includes optimizing the calculation scenario by at least merging the parent multiprovider and the child multiprovider.

3. The system of claim 2, wherein the parent multiprovider and the child multiprovider are merged by at least:
   adding, to the parent multiprovider, the part provider from which the child multiprovider aggregates data, the part provider comprising a data partition; and
   removing the child multiprovider as a calculation node from the calculation scenario.

4. The system of claim 3, wherein the first quantity of data records the child multiprovider aggregates from the part provider is included in the second count keyfigure of the parent multiprovider as a result of the child multiprovider being merged with the parent multiprovider.

5. The system of claim 1, wherein the parent multiprovider and/or the child multiprovider comprise calculation nodes in the calculation scenario.

6. The system of claim 1, wherein the child multiprovider is associated with the second sum keyfigure but not the first count keyfigure based at least on the child multiprovider aggregating data from the other multiprovider but not from any part providers.

7. The system of claim 1, wherein the child multiprovider is further associated with a calculated keyfigure based on the child multiprovider aggregating data from the part provider and the other multiprovider, and wherein the calculated keyfigure corresponds to a sum of the first count keyfigure and the second sum keyfigure.

8. The system of claim 1, wherein the total quantity of data records aggregated by the parent multiprovider further determined by at least determining the first sum keyfigure and/or the second count keyfigure of the parent multiprovider.

9. A computer-implemented method, comprising:

executing, at a database, a calculation scenario, the calculation scenario including a parent multiprovider that aggregates data from a child multiprovider, and the execution of the calculation scenario includes determining a total quantity of data records aggregated by the parent multiprovider by at least determining whether the child multiprovider aggregates data from a part provider and/or another multiprovider, mapping a first count keyfigure of the child multiprovider to a first sum keyfigure of the parent multiprovider in response to the child multiprovider aggregating data from the part provider but not from the other multiprovider, the first count keyfigure corresponding to a first quantity of data records the child multiprovider aggregates from the part provider but not from the other multiprovider, and the first sum keyfigure corresponding to a second quantity of data records the parent multiprovider aggregates from the child multiprovider but not from one or more part providers, mapping a second sum keyfigure of the child multiprovider to the first sum keyfigure of the parent multiprovider in response to the child multiprovider aggregating data from the other multiprovider but not from the part provider, the second sum keyfigure corresponding to a third quantity of data records the child multiprovider aggregates from the other multiprovider but not from the part provider, and mapping the first count keyfigure of the child multiprovider to a second count keyfigure of the parent multiprovider and the second sum keyfigure of the child multiprovider to the first sum keyfigure of the parent multiprovider in response to the child multiprovider aggregating data from the part provider and the other multiprovider, the second count keyfigure corresponding to a fourth quantity of data records the parent multiprovider aggregates from the part provider but not from one or more other multiproviders.

10. The method of claim 9, wherein the execution of the calculation scenario further includes optimizing the calculation scenario by at least merging the parent multiprovider and the child multiprovider.

11. The method of claim 10, wherein the parent multiprovider and the child multiprovider are merged by at least:

adding, to the parent multiprovider, the part provider from which the child multiprovider aggregates data, the part provider comprising a data partition; and removing the child multiprovider as a calculation node from the calculation scenario.

12. The method of claim 11, wherein the first quantity of data records the child multiprovider aggregates from the part provider is included in the second count keyfigure of the parent multiprovider as a result of the child multiprovider being merged with the parent multiprovider.

13. The method of claim 9, wherein the parent multiprovider and/or the child multiprovider comprise calculation nodes in the calculation scenario.

14. The system of claim 9, wherein the child multiprovider is associated with the second sum keyfigure but not the first count keyfigure based at least on the child multiprovider aggregating data from the other multiprovider but not from any part providers.

15. The method of claim 9, wherein the child multiprovider is further associated with a calculated keyfigure based on the child multiprovider aggregating data from the part provider and the other multiprovider, and wherein the calculated keyfigure corresponds to a sum of the first count keyfigure and the second sum keyfigure.

16. A non-transitory computer-readable storage medium including program code, which when executed by at least one data processor, cause operations comprising:

executing, at a database, a calculation scenario, the calculation scenario including a parent multiprovider that aggregates data from a child multiprovider, and the execution of the calculation scenario includes determining a total quantity of data records aggregated by the parent multiprovider by at least determining whether the child multiprovider aggregates data from a part provider and/or another multiprovider, mapping a first count keyfigure of the child multiprovider to a first sum keyfigure of the parent multiprovider in response to the child multiprovider aggregating data from the part provider but not from the other multiprovider, the first count keyfigure corresponding to a first quantity of data records the child multiprovider aggregates from the part provider but not from the other multiprovider, and the first sum keyfigure corresponding to a second quantity of data records the parent multiprovider aggregates from the child multiprovider but not from one or more part providers, mapping a second sum keyfigure of the child multiprovider to the first sum keyfigure of the parent multiprovider in response to the child multiprovider aggregating data from the other multiprovider but not from the part provider, the second sum keyfigure corresponding to a third quantity of data records the child multiprovider aggregates from the other multiprovider but not from the part provider, and mapping the first count keyfigure of the child multiprovider to a second count keyfigure of the parent multiprovider and the second sum keyfigure of the child multiprovider to the first sum keyfigure of the parent multiprovider in response to the child multiprovider aggregating data from the part provider and the other multiprovider, the second count keyfigure corresponding to a fourth quantity of data records the parent multiprovider aggregates from the part provider but not from one or more other multiproviders.

* * * * *